United States Patent
Chiang et al.

(10) Patent No.: US 8,139,137 B2
(45) Date of Patent: Mar. 20, 2012

(54) FOCUSING METHOD, SUITABLE FOR AN IMAGE CAPTURING APPARATUS USING IN AN ENVIRONMENT OF LOW BRIGHTNESS AND IMAGE CAPTURING APPARATUS USING THE SAME

(75) Inventors: Ming-Feng Chiang, Miaolo County (TW); Chia-Ho Lin, Hsinchu County (TW); Jung-Che Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 809 days.

(21) Appl. No.: 11/940,324

(22) Filed: Nov. 15, 2007

(65) Prior Publication Data
US 2008/0309779 A1 Dec. 18, 2008

(30) Foreign Application Priority Data
Jun. 14, 2007 (TW) ................................ 96121491 A

(51) Int. Cl.
*G03B 13/00* (2006.01)
*H04N 5/232* (2006.01)
(52) U.S. Cl. ........................................ 348/345; 348/353
(58) Field of Classification Search ............... 348/220.1, 348/345, 349, 356
See application file for complete search history.

(56) References Cited

U.S. PATENT DOCUMENTS

| | | | | |
|---|---|---|---|---|
| 5,258,801 A | * | 11/1993 | Kusaka et al. | 396/123 |
| 7,133,078 B2 | * | 11/2006 | Nagasawa | 348/353 |
| 2003/0035477 A1 | * | 2/2003 | Sekiguchi et al. | 375/240.08 |
| 2003/0174232 A1 | * | 9/2003 | Yahagi et al. | 348/345 |
| 2004/0239790 A1 | * | 12/2004 | Maeda et al. | 348/311 |
| 2005/0212950 A1 | * | 9/2005 | Kanai | 348/345 |
| 2007/0285556 A1 | * | 12/2007 | Nakahara | 348/345 |

* cited by examiner

*Primary Examiner* — Lin Ye
*Assistant Examiner* — Euel Cowan
(74) *Attorney, Agent, or Firm* — Jianq Chyun IP Office

(57) ABSTRACT

A focusing method, suitable for an image capturing apparatus using in an environment of low brightness, is provided herein. The focusing method includes that an image sensing unit in the image capturing apparatus is wholly or partially divided into a plurality of regions, and digital image data sensed by the image sensing unit is divided into a plurality of sets corresponding to the regions of the image sensing unit. The regional image data corresponding to each of the regions are summed up during the focusing step, so as to obtain a sum of data for each region. Each sum of data is used to calculate a corresponding contrast value, and the contrast value is used to perform calculations for the focusing step, so as to obtain a focus.

20 Claims, 6 Drawing Sheets

FOCUSING METHOD, SUITABLE FOR AN IMAGE CAPTURING APPARATUS USING IN AN ENVIRONMENT OF LOW BRIGHTNESS AND IMAGE CAPTURING APPARATUS USING THE SAME

CROSS-REFERENCE TO RELATED APPLICATION

This application claims the priority benefit of Taiwan application serial no. 96121491, filed on Jun. 14 9, 2007. All disclosure of the Taiwan application is incorporated herein by reference.

BACKGROUND OF THE INVENTION

1. Field of the Invention

The present invention relates to a focusing method. More particularly, the present invention relates to a focusing method suitable for an image capturing apparatus using in an environment of low brightness.

2. Description of Related Art

FIG. 1 shows a basic architecture in a digital camera. Referring to FIG. 1, the digital camera 100 at least includes a lens 104, an image sensing unit 106, an analog/digital converting unit 108, and a digital image processing apparatus 110. An image 102 of an object is converted into a series of voltage signals 107 through the lens 104 by the image sensing unit 106 in a manner of scanning, and then, the voltage signals are converted into digital image sensing data 109, i.e., generally called frame image data, by the analog/digital converting unit 108, such that the image is processed in the digital image processing apparatus 110, and finally, the image captured by the user is obtained. As for the focusing method of the digital camera 100, the obtained image data is used for performing calculations, so as to obtain a focus position.

However, under the environment of low brightness, the common digital camera is restricted by the sensitive capability of the image sensing unit 106, and thus, it usually cannot be focused effectively. In view of this disadvantage, the digital camera generally adopts a focus assist light or a flash light to increase the environmental brightness, so as to improve the focusing performance under the environment of low brightness. Even so, with the image processing method on the digital image processing apparatus 110 in the conventional art, the digital camera still cannot obtain the suitable focus under the environment of low brightness, and the reasons are described as follows.

Referring to FIG. 2, it mainly shows a basic architecture of a digital image processing apparatus 110. In FIG. 2, the digital image processing apparatus 110 includes a dynamic random access memory (DRAM) 202, an interface module 204, an image pipeline module 206, a statistics module for contrast value 208, an image scaling module 210, and a display module 212. The DRAM 202 can be used to register the data required to be processed by the interface module 204, the image pipeline module 206, the image scaling module 210, and the display module 212.

When the user previews the images on the digital camera, after the interface module 204 receives the digital image sensing data 109, the interface module 204 itself or the image pipeline module 206 generally performs a horizontal/vertical down sample process on the digital image sensing data 109, so as to reduce the data to a suitable display size. Then, the statistics module for contrast value 208 is used to count the contrast value in statistics, so as to perform the automatic focusing process. Next, the image pipeline module 206 further processes the image, for example, performs a color filter array interpolation, so as to separate the voltage signals into three primary color signals, and performs a color space transfer. Then, the image scaling module 210 is used to scale the image to a size required by a screen 214, and then output the image to the display module 212 that displays the image on the screen 214.

The so-called down sample process, taking the horizontal down sample process as an example, the data of 2048×300 pixels is reduced to 640×300 pixels, for example, as shown in FIG. 3, A size is reduced to B size. FIG. 3 is a schematic view of the horizontal down sample process. The data of 2048×300 pixels contains 300 batches of horizontal scanning line data for the horizontal direction, and contains 2048 batches of vertical scanning line data for the vertical direction. As for the vertical down sample process and the vertical and horizontal down sample process, the principles thereof are the same as that of the horizontal down sample process, so they are not described herein any more.

The digital image sensing data 109 is arranged and presented in a Bayer pattern put forward by Doctor Bayer, and as shown by Number 402 of FIG. 4, which is usually called raw data. Raw indicates an original record after the image sensing unit (as shown by 106 in FIG. 1) senses the light, and completely records the color level generated after the image passes through a Bayer-pattern filter. If the down sample process is performed on the digital image sensing data 109, for example, the horizontal down sample process is performed on the vertical scanning line data 404, 406, and 408 of FIG. 4, when a vertical scanning line data is formed, the resolution is reduced, and the original record is damaged.

Therefore, in the case that the environmental brightness is sufficient, the digital camera obtains the contrast value by using the data after the down sample process while changing the focus of the lens. At this time, a focus curve is obtained, and the focus curve is sufficient for the statistics module for contrast value (as shown by 208 of FIG. 2) to obtain a position where the contrast value is the highest in statistics, so as to obtain the optimal focus, as shown in FIG. 5. FIG. 5 shows a focus curve when the environmental brightness is sufficient. However, if the environmental brightness is not sufficient, and the curvature of the whole focus curve becomes indistinct due to a reduced signal to noise ratio (SNR), it is hard to determine the optimal focus point, as shown in FIG. 6. FIG. 6 shows a focus curve when the environmental brightness is insufficient. If the noise effect is further considered, the more actual focus curve is shown in FIG. 7. FIG. 7 shows a focus curve with noises.

In addition, in the conventional art, the exposure time of the same batch of digital image sensing data (i.e., the same frame) is prolonged, for example, the exposure time is prolonged from the original 1/30 seconds to 1/15 seconds, so as to increase the focusing capability of the digital camera in the environment of low brightness, and the effect is not desirable. Therefore, it is an urgent problem to be solved by designers and manufacturers of the digital camera about how to increase the focusing capability of the digital camera in the environment of low brightness, which not only involves the quality of the image captured by the digital camera, but also greatly affects the consumers' purchasing desire.

SUMMARY OF THE INVENTION

Accordingly, the present invention is directed to a focusing method suitable for an image capturing apparatus in an environment of low brightness and an apparatus using the same, capable of improving the focusing accuracy and focusing speed of the image capturing apparatus in the environment of low brightness.

As embodied and broadly described herein, the present invention provides a focusing method suitable for an image capturing apparatus in the environment of low brightness, which includes the following steps. Firstly, the digital image data captured by the image capturing apparatus is divided into data corresponding to a plurality of regions. Next, the digital image data corresponding to each region are summed up to obtain a sum of data for each region, and the sums of data for the regions are used to calculate a corresponding contrast value. Then, the contrast value is used to perform calculations for the focusing step, so as to obtain a focus point.

The present invention provides an image capturing apparatus suitable for focusing in the environment of low brightness, which includes an image sensing unit, an image processing unit, and a focus adjusting module. The image sensing unit is used to sense an object, and to obtain a digital image data. The image processing unit is used to divide the digital image data into a plurality of region image data corresponding to a plurality of regions, and to sum up the region image data, so as to obtain the sum of data for each region, and thus further calculating a corresponding contrast value. The focus adjusting module is used to perform calculations for the focusing step according to the contrast values, so as to obtain a focus point.

In the focusing method and apparatus using the same, the step of summing up the digital image data corresponding to each region is performed in a way of first dividing the data in each region into a plurality of sets of sub regions, and then summing up the digital image data corresponding to space of each sub region. In the embodiments, a plurality of horizontal lines, a plurality of vertical lines, or a plurality of block data of the digital image data can also be summed up.

In the focusing method and apparatus using the same, the step of summing up the digital image data corresponding to each region includes summing up the plurality of digital image data obtained by a plurality of frames in each region. In a specific embodiment, a motion estimation mechanism can be further added to estimate the image moving direction to adjust the digital image data.

In the present invention, the data accumulation is directly performed to the digital image sensing data in terms of space or time, without performing the down sample process, so as to improve the SNR of the data, and thus calculating the contrast value in statistic, and obtaining the optimal focus point. Therefore, in the present invention, not only the focusing accuracy and focusing speed of the image capturing apparatus in the environment of low brightness can be improved, but the quality of the image captured by the image capturing apparatus in the environment of low brightness can also be improved.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a focusing method suitable for an image capturing apparatus using in an environment of low brightness, and the image capturing apparatus can be a digital camera or a video camera, etc. The focusing method includes that an image sensing unit of the image capturing apparatus is wholly or partially divided into a plurality of regions, and digital image data sensed by the image sensing unit is divided into a plurality of sets corresponding to the regions of the image sensing unit. Next, the digital image data corresponding to each of the regions are summed up during the focusing step, so as to obtain a sum of the data for each region. Then, each sum of data is used to calculate a corresponding contrast value, and the contrast value is used to perform calculations for the focusing step, so as to obtain a focus position.

In the focusing method suitable for the image capturing apparatus using in the environment of low brightness according to the present invention, the step of summing up the digital image data obtained by each region includes summing up the data sensed by space of each of the regions. That is, all the captured raw digital image data in a specific region is summed up, to serve as a basis for the focusing process. The space summation referred herein can be achieved through different ways, including summing up of a plurality of blocks, or summing up of a plurality of straight lines, or summing up of a plurality of horizontal lines, which all fall within the scope of the present invention.

In an alternative embodiment, the step of summing up the digital image data obtained by each region includes summing up the data sensed by a plurality of frames different in time but corresponding to the same region. In this way, the exposure time can be reduced to a half or a quarter of the original exposure time, or even shorter, so as to obtain the digital image data of different frames in the same region for being summed up. By means of summing up the data of different frames, the SNR can be increased. In order to avoid an excessive displacement of the image due to different frames at different time, a motion estimation mechanism is further used to estimate the vector, so as to more accurately calculate the sum of the data for the plurality of frames.

Figure 1:
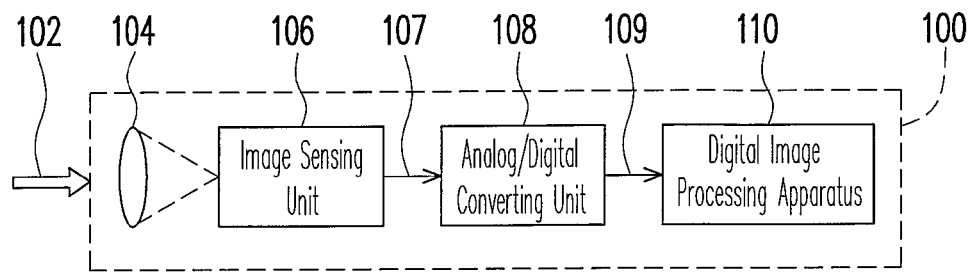
FIG. 1 shows a basic architecture of an image capturing apparatus.
Figure 2:
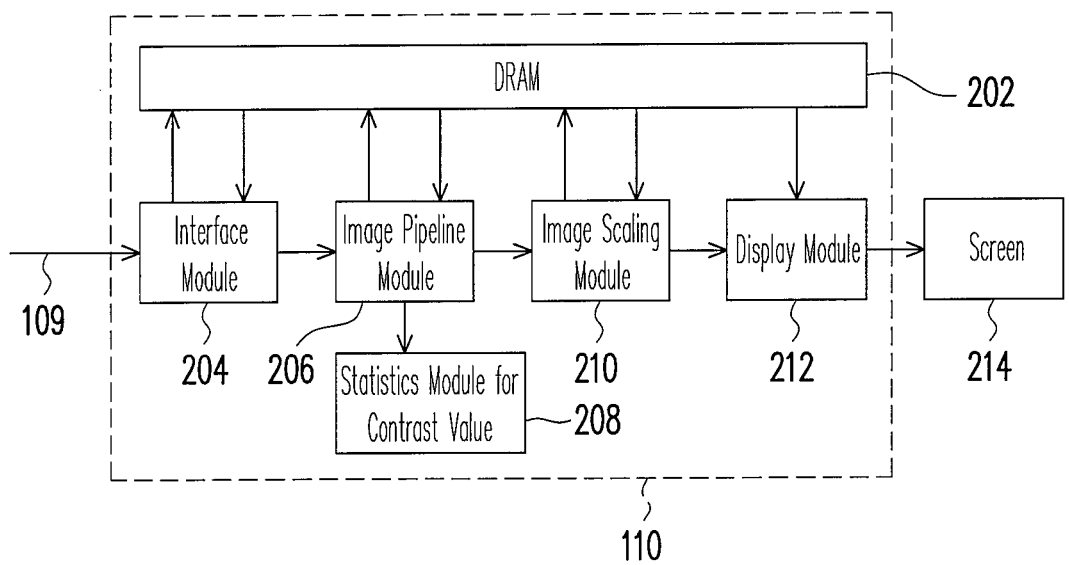
FIG. 2 shows a basic architecture of a digital image processing apparatus 110.
Figure 3:
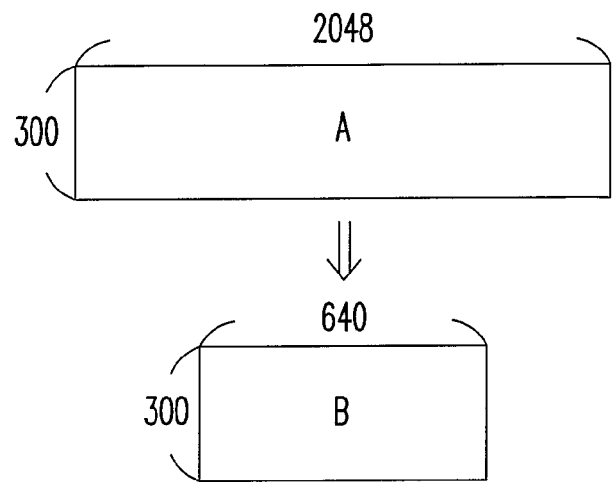
FIG. 3 is a schematic view of a horizontal down sample process.
Figure 4:
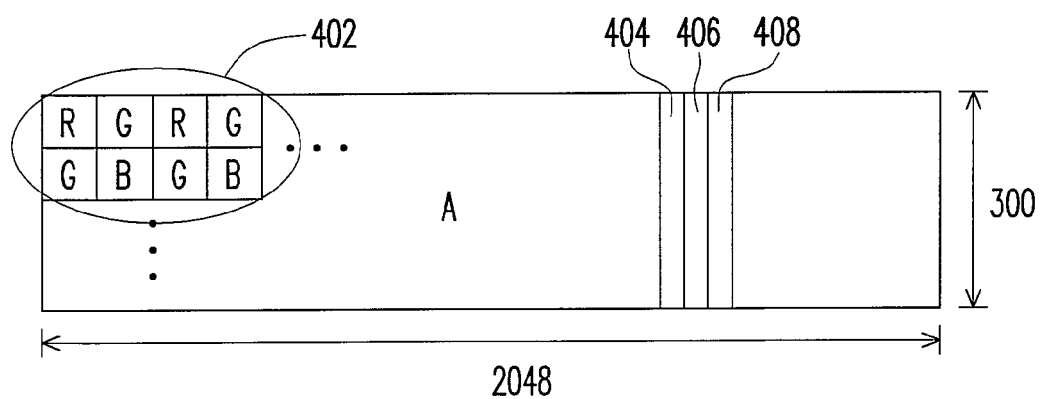
FIG. 4 is a schematic view of digital image sensing data presented by Bayer data.
Figure 5:
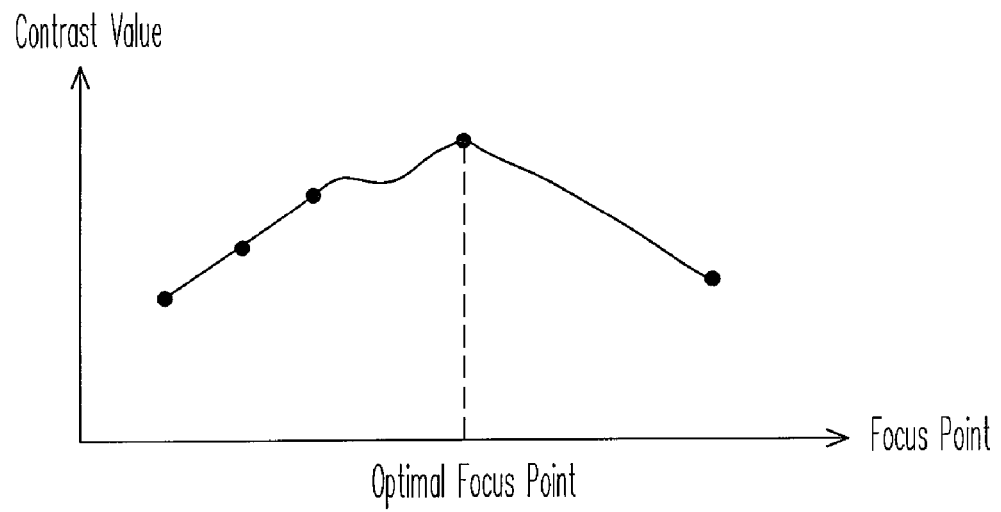
FIG. 5 shows a focus curve when the environmental brightness is sufficient.
Figure 6:
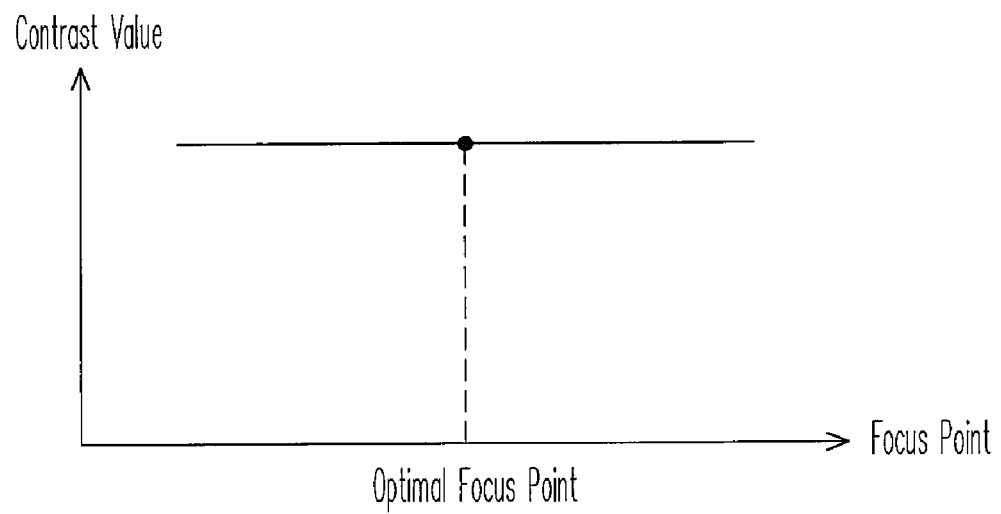
FIG. 6 shows a focus curve when the environmental brightness is insufficient.
Figure 7:
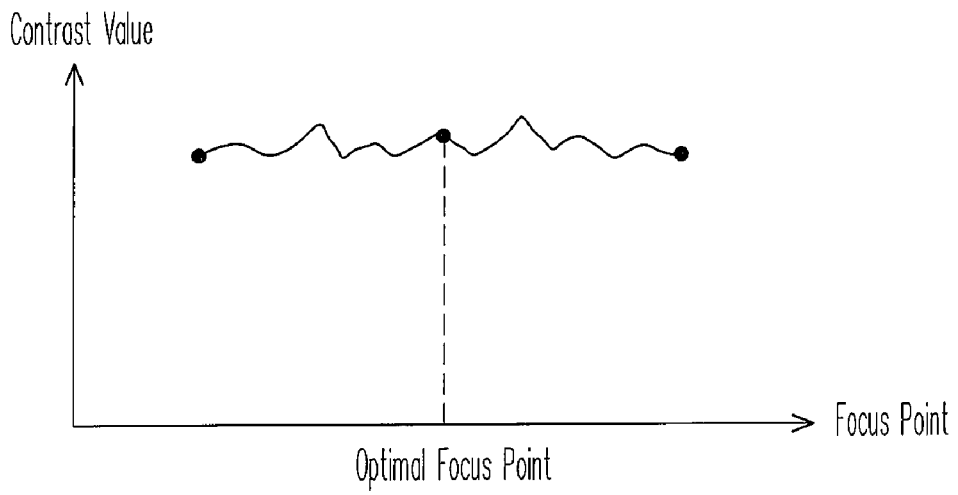
FIG. 7 shows a focus curve with noises.
Figure 8:
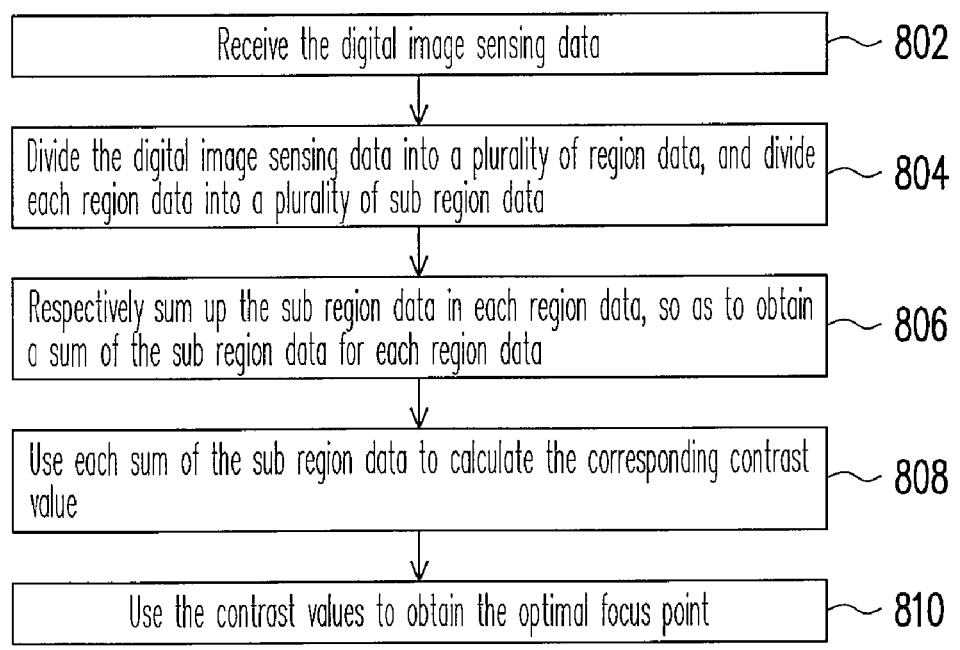
FIG. 8 is a flow chart of a focusing method according to an embodiment of the present invention.

Referring to FIG. 8, it is a schematic flow chart of a focusing method using the space summation according to an embodiment of the present invention. Firstly, array positions of the image sensing unit in the image capturing apparatus are partially or wholly divided into a plurality of regions. When the image capturing apparatus (for example, a digital camera, a video camera, or any apparatus requiring focusing and capturing images) is in a focus mode of low brightness, the captured digital image sensing data is divided into a plurality of sets of region data according to the regions.

Next, each region data is divided into a plurality of sub region data (Step 804 of FIG. 8), for example, it is divided into three horizontal scanning line sub regions, and each of the sub regions includes a plurality of horizontal scanning lines. Then, the sub region data in each region data is summed up respectively, so as to obtain a sum of the sub region data for each region data (Step 806 of FIG. 8), that is, to obtain a sum of horizontal scanning line data.

Then, each sum of the sub region data is used to calculate the corresponding contrast value (Step 808 of FIG. 8). Then, the contrast values are used to perform an automatic focusing process (Step 810 of FIG. 8). In this way, the SNR of the data is increased by multiple times, such that the focusing capability of the image capturing apparatus is enhanced. For example, in the above example, if each region data is divided into 3 horizontal scanning line sub regions, the image capturing apparatus can perform the focusing process under a case that the brightness is three times lower than the original brightness. Similarly, if the data of 10 horizontal scanning lines is summed up, the image capturing apparatus can perform the focusing process under a case that the brightness is 10 times lower than the original brightness. In addition, the sizes of the divided region data and sub region data can be varied depending upon the designing requirements, which are not particularly limited.

Figure 9:
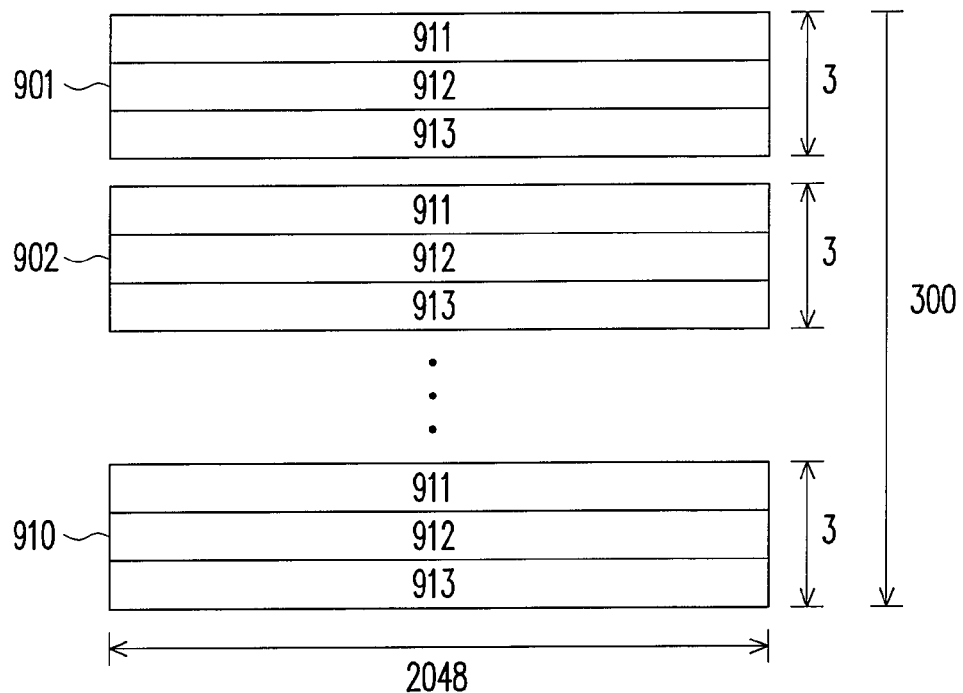
FIG. 9 is a schematic view of the division of the digital image sensing data according to an embodiment of the present invention.

FIG. 8 is a flow chart of a focusing method using the space summation according to an embodiment of the present invention. Referring to FIG. 9, it is a schematic view that shows how to divide the digital image sensing data into 10 horizontal scanning line regions 901-910. Then, each of the regions 901-910 is divided into 3 sub regions 911-913. The number of horizontal scanning lines corresponding to each of the sub regions 911-913 is adjusted depending upon the designing requirement. When each horizontal scanning line region is divided into 3 sub regions, the image capturing apparatus can perform the focusing process under a case that the brightness is three times lower than the original brightness. Similarly, if 10 horizontal scanning lines are corresponding to each of the sub regions 911-913, after the step of summing up, the image capturing apparatus can perform the focusing process under a case that the brightness is ten times lower than the original brightness.

Figure 10:
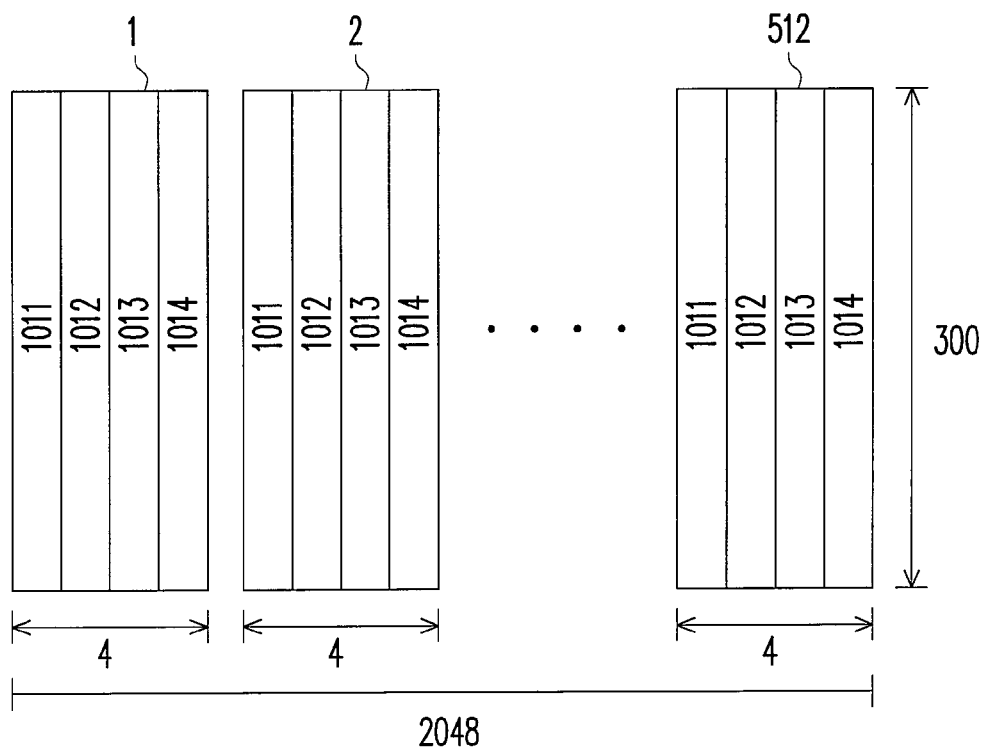
FIG. 10 is a schematic view of the division of the digital image sensing data according to another embodiment of the present invention.

Based on the spirit of the embodiment shown in FIG. 9, definitely, the present invention can also sum up the vertical scanning line data, as shown in FIG. 10. FIG. 10 is a schematic view of the division of the digital image sensing data according to another embodiment of the present invention. Firstly, it is assumed that the size of the digital image sensing data is 2048×300 pixels.

When the image capturing apparatus is in the focus mode of low brightness, after the image pipeline module in the image capturing apparatus receives the digital image sensing data, the captured digital image sensing data is divided into 512 region data, as shown by 1-512 of FIG. 10. Next, each region data is divided into 4 sub region data 1011-1014, i.e., 4 vertical scanning line data. Then, the sub region data 1011-1014 in each region data is summed up, so as to obtain a sum of the sub region data for each region data, i.e., a sum of vertical scanning line data.

Then, each sum of the sub region data is used to calculate the corresponding contrast value, for example, the sum of the sub region data obtained by the region data 1 is used to calculate the corresponding contrast value, the sum of the sub region data obtained by the region data 2 is used to calculate the corresponding contrast value, and so forth. Then, the contrast values are used for automatic focus. In this manner, the SNR of the data is increased by four times, such that the focusing capability of the image capturing apparatus is enhanced. Similarly, if the data of 10 vertical scanning lines is summed up, the image capturing apparatus can perform the focusing process under a case that the brightness is 10 times lower than the original brightness.

Figure 11:
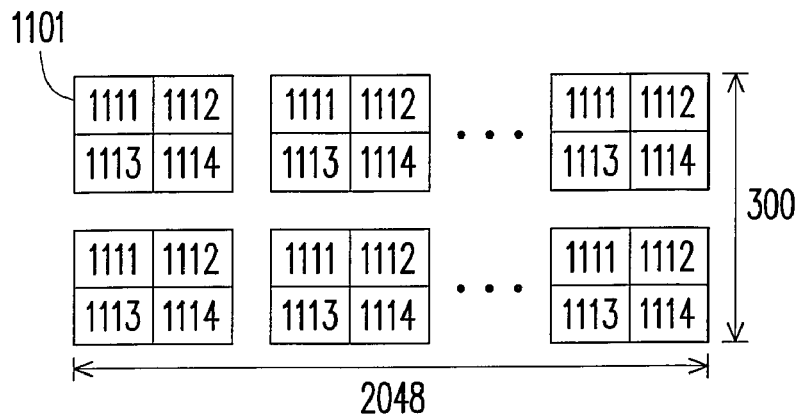
FIG. 11 is a schematic view of the division of the digital image sensing data according to still another embodiment of the present invention.

In addition, it is an alternative implementation manner to utilize the block data for performing accumulation, as shown in FIG. 11. FIG. 11 is a schematic view of the division of the digital image sensing data according to still another embodiment of the present invention. Firstly, it is assumed that the size of the digital image sensing data is 2048×300 pixels. The digital image sensing data is divided into a plurality of region data 1101, and the region data 1101 is further divided into a plurality of sub region data, for example, it is divided into block-type block data 1111-1114. Next, the block data 1111-1114 in each region data 1101 is summed up, so as to obtain a sum of the sub region data for each region data 1101. Then, each sum of the sub region data is used to calculate the corresponding contrast value, and the contrast values are used for performing the automatic focus. The sizes of the block data and the sub region data can be varied depending upon the actual designing requirements, which are not particularly limited.

According to the teaching of the above embodiment, in the present invention, the digital image sensing data in several batches of frames can also be summed up, so as to enhance the focusing capability of the image capturing apparatus in the environment of low brightness. The method is shown in FIG. 12.

Figure 12:
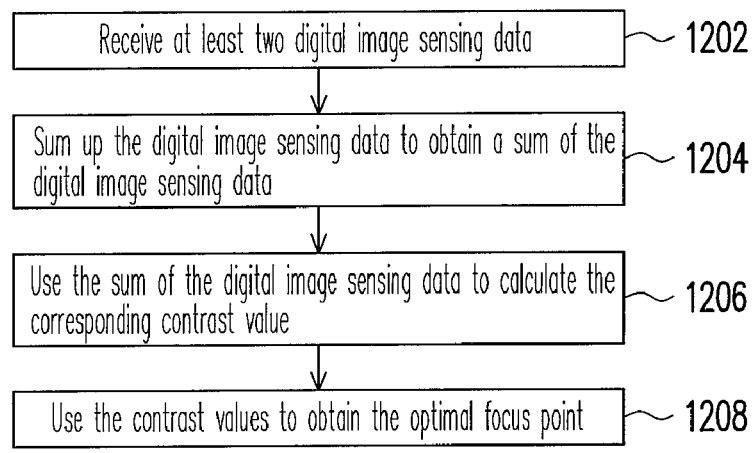
FIG. 12 is a flow chart of a focusing method according to another embodiment of the present invention.
Figure 13:
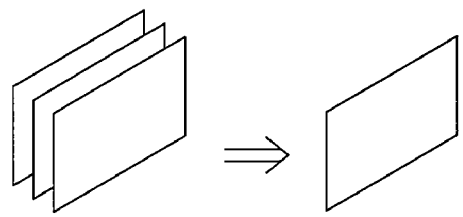
FIG. 13 is a schematic view of the summing up of the digital image sensing data.

FIG. 12 is a flow chart of a focusing method according to another embodiment of the present invention. Referring to FIG. 12, when the image capturing apparatus is in the focusing mode of low brightness, after the image pipe line module in the image capturing apparatus receives at least two digital image sensing data (Step 1202 of FIG. 12), the digital image sensing data is summed up to obtain a sum of the digital image sensing data (Step 1204 of FIG. 12), as shown in FIG. 13. FIG. 13 is a schematic view of the summing up of the digital image sensing data. Then, the sum of the digital image sensing data is used to calculate the corresponding contrast value, and then the contrast value is used for performing the automatic focus. In this manner, the SNR of the data is increased, such that the focusing capability of the image capturing apparatus is enhanced, and the image capturing apparatus can perform the focusing process in an environment with the brightness lower than the original brightness.

It should be noted that, although several possible implementation aspects of the present invention have already been described in the above embodiments, those of ordinary skill in the art should know that the designing manners for each manufacturer in terms of summing up the data are varied from each other, so the applications of the present invention are not limited to that mentioned above. In other words, so long as the focusing process that can be performed in the environment with the brightness lower than the original brightness is achieved by means of summing up the data to increase the SNR of the data and to further enhance the focusing capability of the image capturing apparatus, it falls within the spirits of the present invention.

To sum up, in the present invention, the data accumulation operation is directly performed to the digital image sensing data in terms of space or time, without performing the down sample process, so as to improve the SNR of the data, to have the contrast value in statistics, and to further obtain the optimal focus. Therefore, in the present invention, not only the focusing accuracy and focusing speed of the image capturing apparatus in the environment of low brightness are increased, but the quality of the image captured by the image capturing apparatus in the environment of low brightness is also enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A focusing method suitable for an image capturing apparatus in an environment of low brightness, the focusing method comprising:
   a digital image processor dividing a digital image data captured by the image capturing apparatus into a plurality of regional digital image data corresponding to a plurality of regions;
   said digital image processor summing up the plurality of the regional digital image data for each of the regions using digital image data from its own region to obtain a plurality of sums of data for each of the regions;
   using the sums of data of each of the regions to calculate a plurality of contrast values with each contrast value corresponding to its own region; and
   using the plurality of contrast to perform calculations for the focusing step to obtain a focus.

2. The focusing method as claimed in claim 1, wherein the step of summing up the plurality of the regional digital image data corresponding to each of the regions includes dividing the data in each of the regions into a plurality of sets of sub regions, and summing up all of the digital image data corresponding to the sub regions.

3. The focusing method as claimed in claim 2, wherein the step of summing up the plurality of the regional digital image data corresponding to the sub region is summing up a plurality of horizontal lines of the digital image data.

4. The focusing method as claimed in claim 2, wherein the step of summing up the plurality of the regional digital image data corresponding to the sub region is summing up a plurality of vertical lines of the digital image data.

5. The focusing method as claimed in claim 2, wherein the step of summing up the plurality of the regional digital image data corresponding to the sub region is summing up a plurality of block data of the digital image data in the sub region.

6. The focusing method as claimed in claim 1, wherein the step of summing up the plurality of the regional digital image data corresponding to each region comprises summing up the digital image data obtained by a plurality of frames in each region within a predetermined time period.

7. The focusing method as claimed in claim 6, wherein the step of summing up the plurality of the regional digital image data obtained by the plurality of frames in each region further comprises adding a motion estimation mechanism to estimate an image moving direction, so as to adjust the digital image data accordingly.

8. An image capturing apparatus suitable for focusing in an environment of low brightness, the image capturing apparatus comprising:
   an image sensing unit, for sensing an object and obtaining a digital image data;
   an image processing unit, for dividing the digital image data into a plurality of regional image data corresponding to a plurality of regions, and summing up the plurality of regional image data for each of the regions using digital image data from its own region, so as to obtain a plurality of sums of data for each of the regions and to calculate a plurality of contrast values with each of the contrast values corresponds to its own region according to the sums of data; and
   a focus adjusting module, for performing calculations for the focusing step according to the plurality of contrast values, so as to obtain a focus.

9. The image capturing apparatus as claimed in claim 8, wherein in the image processing unit, the step of summing up the regional image data corresponding each region comprises dividing the data in each region into a plurality of sets of sub regions, and summing up the digital image data corresponding to each of the sub regions.

10. The image capturing apparatus as claimed in claim 9, wherein in the image processing unit, the step of summing up the regional image data corresponding to the sub region is summing up a plurality of horizontal lines of the digital image data.

11. The image capturing apparatus as claimed in claim 9, wherein in the image processing unit, the step of summing up the regional image data corresponding to the sub region is summing up a plurality of vertical lines of the digital image data.

12. The image capturing apparatus as claimed in claim 9, wherein in the image processing unit, the step of summing up the regional image data corresponding to the sub region is summing up a plurality of block data of the digital image data in the sub region.

13. The image capturing apparatus as claimed in claim 8, wherein in the image processing unit, the step of summing up the regional image data corresponding to each region comprises summing up the regional image data obtained by a plurality of frames in each region within a predetermined time period.

14. The image capturing apparatus as claimed in claim 13, wherein in the image processing unit, the step of summing up the regional image data obtained by the plurality of frames in each region further comprises adding a motion estimation mechanism to estimate the moving direction of the image, so as to adjust the digital image data.

15. A focusing method suitable for an image capturing apparatus in an environment of low brightness, the focusing method comprising: a digital image processor dividing a portion of a digital image data captured by the image capturing apparatus into a plurality of regional digital image data corresponding to a plurality of predefined regions;
   said digital image processor summing up the plurality of the regional digital image data for each of the predefined regions using digital image data from its own region to obtain a plurality of sums of data for each of the predefined regions;

using the sums of data of each of the regions to calculate a plurality of contrast values with each of the contrast values corresponding to its own predefined regions;

and using the plurality of contrast values to perform calculations for the focusing step to obtain a focus.

16. The focusing method as claimed in claim 15, each of the predefined regions being divided into a plurality of sets of sub regions, and the sum of data for each of the predefined regions is obtained by summing up all of the digital image data corresponding to the sub regions.

17. The focusing method as claimed in claim 16, wherein the digital image data corresponding to the sub regions is a plurality of horizontal lines of the digital image data.

18. The focusing method as claimed in claim 16, wherein the digital image data corresponding to the sub regions is summing up a plurality of vertical lines of the digital image data.

19. The focusing method as claimed in claim 16, wherein the digital image data corresponding to the sub regions is a plurality of block data of the digital image data.

20. The focusing method as claimed in claim 15, wherein the step of summing up the plurality of the regional digital image data corresponding to each predefined region comprises summing up the digital image data obtained by a plurality of frames in each region within a predetermined time period.

* * * * *